United States Patent [19]
Friedman

[11] Patent Number: 4,934,004
[45] Date of Patent: Jun. 19, 1990

[54] ENERGY ABSORBING INFANT CARRIER FOR USE IN VEHICLES

[76] Inventor: Donald Friedman, 4448 Via Esperanza, Santa Barbara, Calif. 93110

[21] Appl. No.: 266,699

[22] Filed: Nov. 3, 1988

Related U.S. Application Data

[63] Continuation-in-part of Ser. No. 57,901, Jun. 2, 1987, Pat. No. 4,804,230, which is a continuation-in-part of Ser. No. 702,953, Feb. 19, 1985, abandoned.

[51] Int. Cl.$^5$ .............................................. A47D 7/04
[52] U.S. Cl. .............................................. 5/94; 5/118; 5/424
[58] Field of Search ........................... 5/94, 118, 424; 297/457, 488, 250, 216, 471, 472

[56] References Cited

U.S. PATENT DOCUMENTS

| | | | |
|---|---|---|---|
| 3,833,946 | 9/1974 | Von Wimmersperg | 5/94 |
| 4,076,306 | 2/1978 | Satzinger | 297/471 |
| 4,366,587 | 1/1983 | Takada | 5/94 |
| 4,481,685 | 11/1984 | Watson | 5/94 |
| 4,583,253 | 4/1986 | Hall | 297/250 |
| 4,681,368 | 7/1987 | Heath et al. | 5/94 |

FOREIGN PATENT DOCUMENTS 1966727  10/1973  Fed. Rep. of Germany ...... 297/216

Primary Examiner—Alexander Grosz
Attorney, Agent, or Firm—Christie, Parker & Hale

[57] ABSTRACT

A carrier for use in vehicles safely transports premature or underweight infants in a bed during normal vehicle motion by directly supporting the infant recumbent along its head, neck and back. An energy absorbtion structure between the bed and the front of a shell that contains the bed permanently deforms and dissipates kinetic energy of the infant from inertial loading by the infant during the rapid deceleration resulting from a collision or panic stop. The bed and shell likewise deform. During the deceleration the bed rotates the infant into the vertical, continuing the direct support along the head, neck and back. A seat belt catch anchors the carrier to the vehicle through a standard seat belt and provides a barrier that keeps the infant in the carrier when experiencing vertical forces. Side walls of the bed absorb and dissipate impact energy from the sides of the carrier.

37 Claims, 5 Drawing Sheets

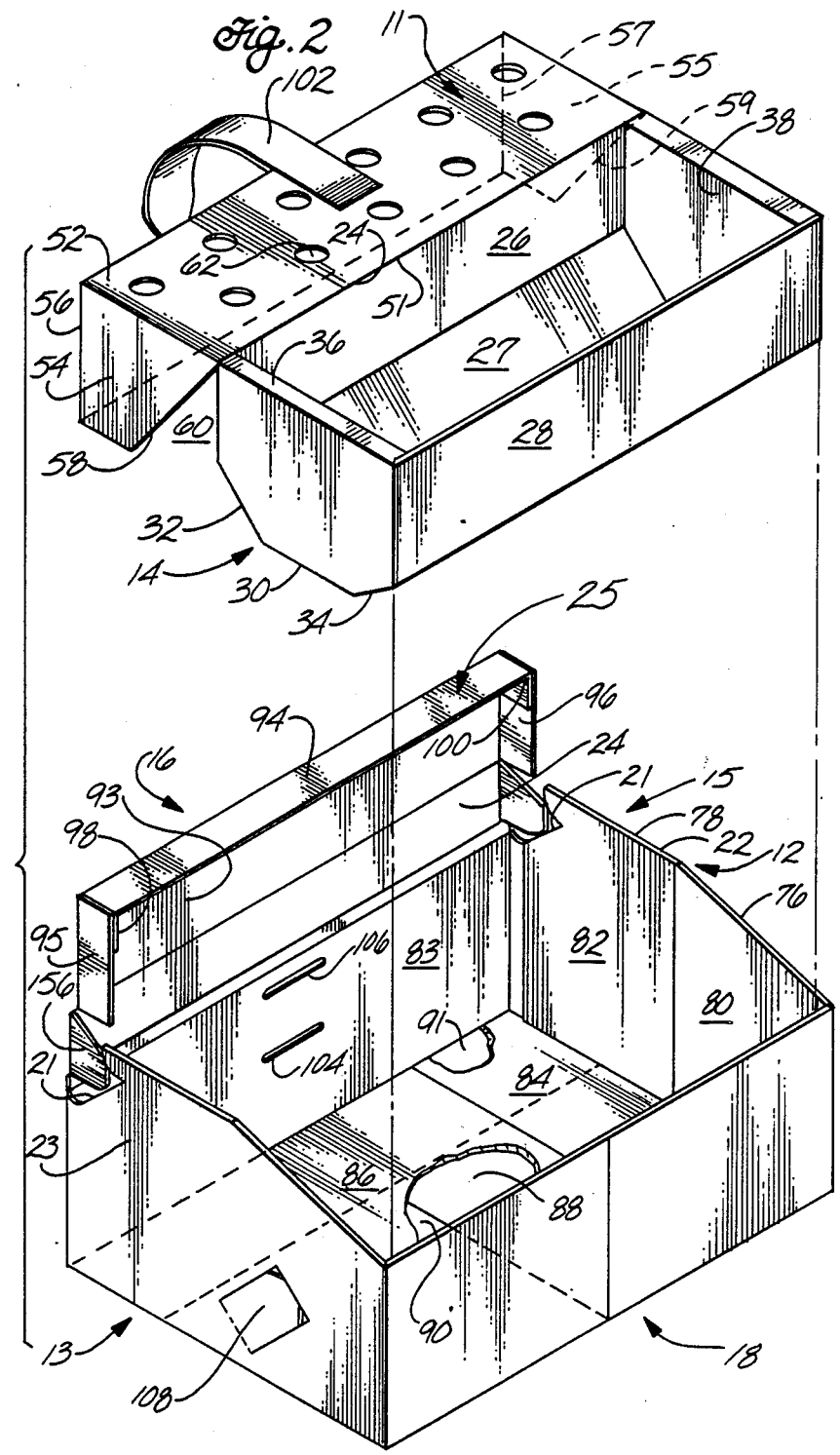

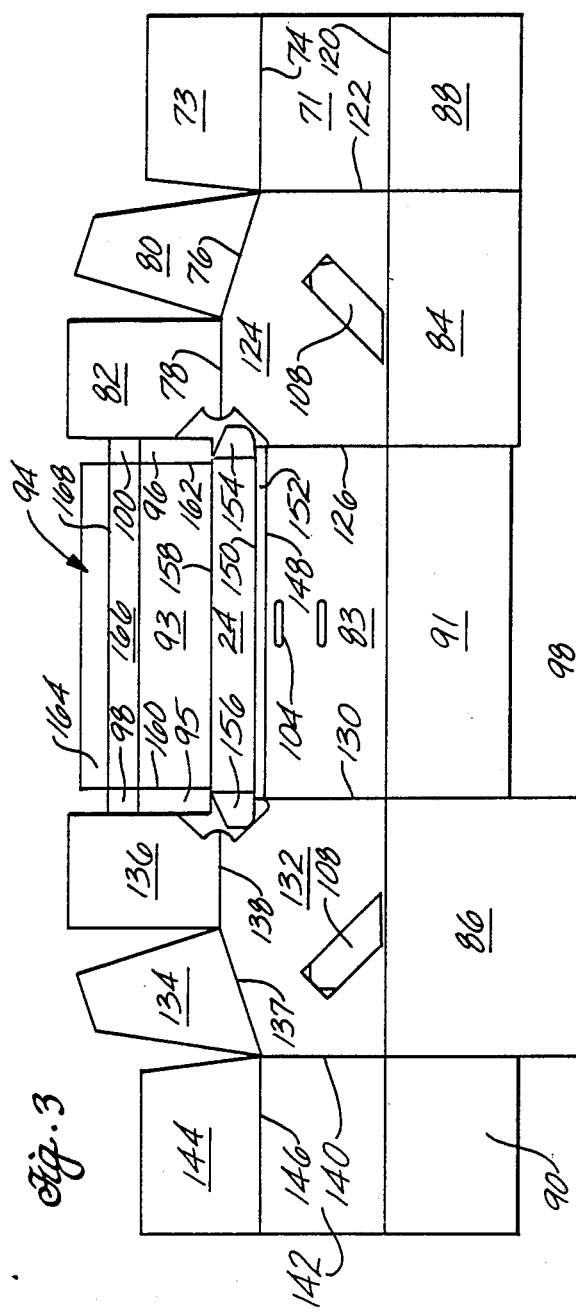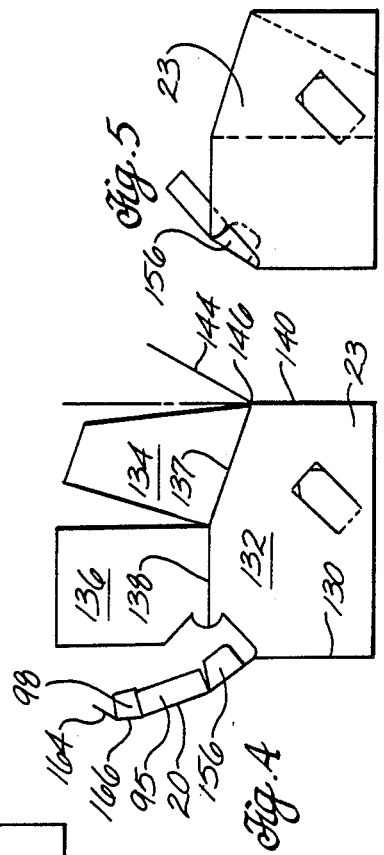

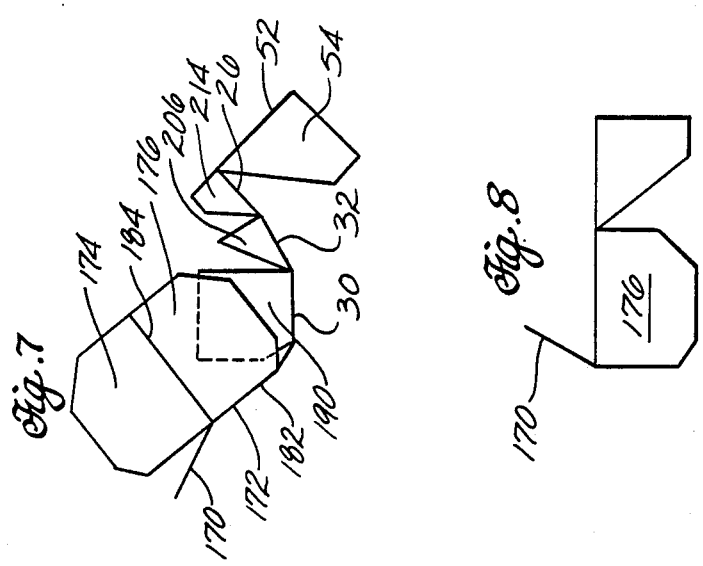
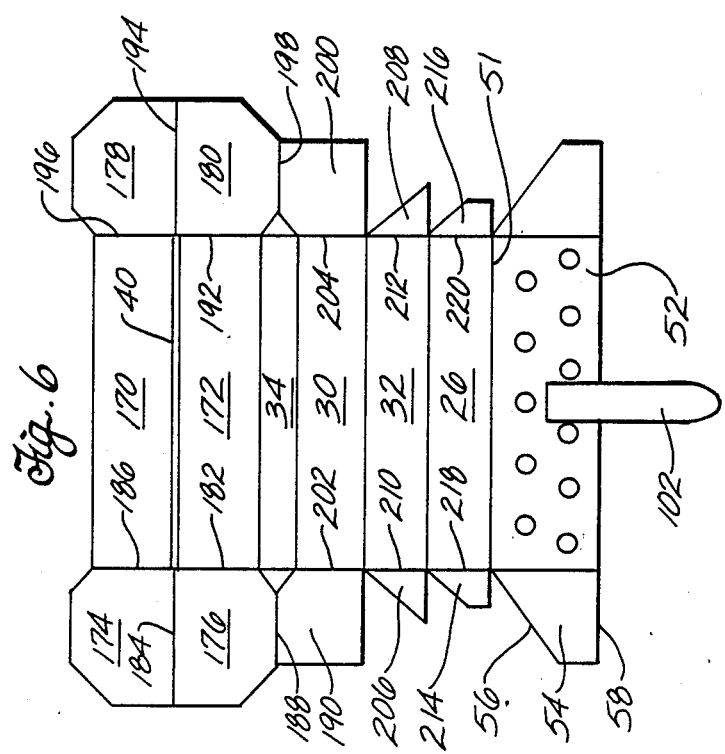

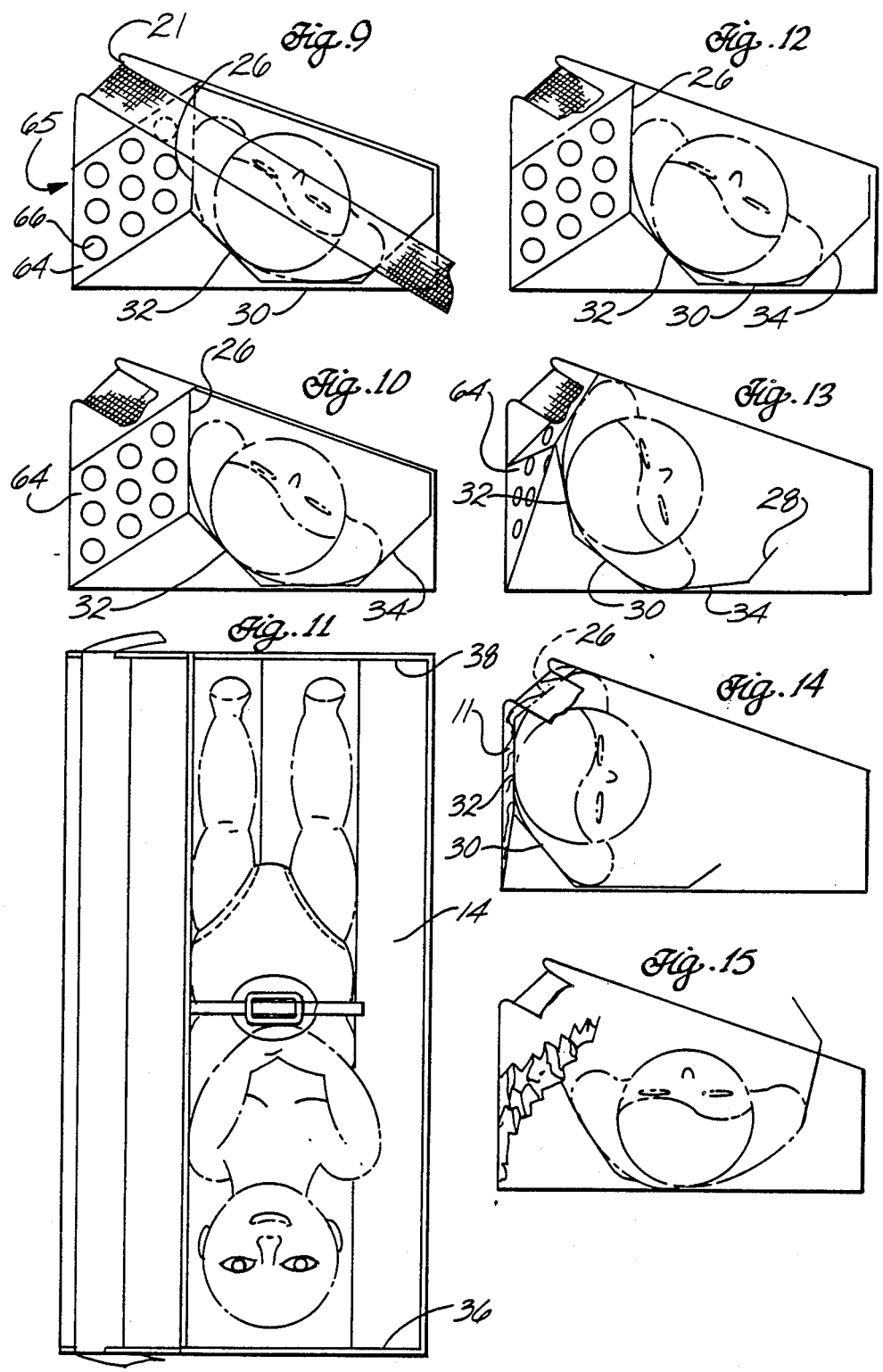

4,934,004

ENERGY ABSORBING INFANT CARRIER FOR USE IN VEHICLES

CROSS-REFERENCE TO RELATED APPLICATION

This is a continuation-in-part application of my co-pending U.S. application Ser. No. 057,901, filed June 2, 1987 now U.S. Pat. No. 4,804,032, which is, in turn, a continuation-in-part application of U.S. application Ser. No. 702,953 filed Feb. 19, 1985 now abandoned.

BACKGROUND OF THE INVENTION

My parent application describes an infant carrier used in vehicles that protects an infant during rapid deceleration of the vehicle. The carrier does this by absorbing and dissipating kinetic energy of the infant during rapid deceleration. Absorbtion and dissipation occurs through permanent deformation of components of the carrier. The carrier specifically described in my parent application is made of cardboard. Cardboard is a good absorber and dissipator of energy and makes an inexpensive carrier. However, other materials can be used.

The carrier specifically described in my earlier application has a bed in a shell. The bed supports an infant in an inclined position facing towards the rear of a vehicle. The bed during rapid deceleration permanently deforms to absorb and dissipate energy while at the same time moving from an inclined position to a more vertical position within the shell. During rapid deceleration the shell is a barrier that keeps the infant within it. The shell can also permanently deform during rapid deceleration to absorb some of the infant's kinetic energy. The absorbtion and dissipation of an infant's kinetic energy during rapid deceleration by the component parts of the carrier significantly reduces reaction loads on the infant from the carrier reacting reaction loads to the inertia of the infant, substantially reducing risk of injury.

When the carrier is not functioning to reduce the risk of injury to an infant during rapid deceleration, the shell orients and supports the bed so that the infant rests comfortably in the carrier in an inclined position facing to the rear of the vehicle. A lap belt secures the carrier in place during normal conditions and restrains the carrier and the infant during rapid deceleration.

Healthy infants of normal weight are sufficiently developed muscularly to breathe without difficulty when sitting upright. For these infants the carrier of my parent application is very satisfactory.

Premature and underweight infants cannot breathe easily when they are in an inclined position. These breathing difficulties can be very serious; in the most serious cases the difficulties can lead to cardiac arrest or to brain damage. Accordingly, premature and underweight infants can experience respiratory difficulties when transported in car seats that support the infants inclined. Premature and underweight infants must be supported along their heads, necks and backs to prevent injury from even modest forces. If these infants are transported recumbent with the proper support, they can be transported without breathing difficulties. But safe transport is another matter. These infants, obviously, are even more susceptible to injury from rapid deceleration than normal weight infants.

Infants should go home from the hospital as soon as possible. If infants go home as soon as the mother recovers, hospital occupancy time usually is short. Further, bond-forming between infant and mother occurs sooner in the home than in the hospital. At present, premature or underweight infants that could otherwise go home, may have to stay in a hospital until healthy and big enough to be safely transported.

It is therefore desirable to provide an infant carrier suitable for transporting premature and underweight infants safely home by providing good crash protection and proper support during the trip and crash protection should the need arise. It is also desirable to provide such a carrier that is so inexpensive as to be attractive to hospitals to supply parents for the trip home. It is also desirable to provide such a carrier that can be stored in a hospital without taking up much space and be assembled just before leaving the hospital.

SUMMARY OF THE INVENTION

The present invention provides a premature infant carrier that during normal travel in a vehicle directly supports an infant while it lies flat along its head, neck and back, keeping weight off its chest to avoid breathing difficulties. The carrier protects the infant during any rapid deceleration by maintaining direct support all along its head, neck and back, and reducing the forces on the infant during such an event by absorbing and dissipating kinetic energy of the infant.

In general, the present invention includes a shell having an interior sized to receive a bed for a premature or underweight infant laying recumbent lengthwise across the direction of vehicle travel. The shell has a front with a seat belt catch for anchoring the shell to the vehicle with a seat belt. The bed directly supports the weight of a recumbent infant with its back generally horizontal along the infant's head, neck and back during normal vehicle movement. During rapid deceleration from a crash or panic stop, means responding to the inertia of the infant in the shell direct a rolling or rotation of the infant from the position where its back is generally horizontal to a position where its back is generally vertical while always directly supporting the head, neck and back in opposition to the acceleration forces. (During the rapid deceleration, the infant remains horizontal but rotates so that its back rotates into the vertical to apply the inertial load of the infant generally perpendicularly to the supporting surfaces of the bed.) The carrier has structure between the bed and the front of the carrier that orients the bed to the rear of the shell and that absorbs and dissipates by permanent deformation kinetic energy of the infant during the rapid deceleration.

In a specific form, the seat belt catch is located proximate the top and along the front of the shell. The horizontal center of gravity of the infant-carrier system is below where the seat belt engages the carrier to anchor it to the vehicle; this prevents the infant and carrier from rotating over the seat belt, which would result in the loss of the constraint.

Preferably, the rotational direction means includes the walls of the bed having directional orientations that in conjunction with the orientation and energy absorbtion structure produce the functions and snugly cradle the infant. Suitable bed wall orientations result, for example, from a forward inclined wall having a vertical component and bottom horizontal wall, the two walls supporting the infant generally in the horizontal during normal vehicle motion. The orientation and energy absorbtion structure engages the bed so that at a predetermined deceleration produced from a crash or panic stop, the inclined wall senses the inertia of the infant and rotates into the vertical, directing the infant to rotate as well, while directly supporting the infant all along its head, neck and back during the entire rotation. Preferably, the bed during normal vehicle motions supports the infant with its back slightly inclined and facing the front of the carrier. This is readily done by the inclined and bottom bed walls. Preferably the bed walls are also made of a material that permanently deforms and absorbs and dissipates kinetic energy of the infant during the rapid deceleration.

In a specific form, the structure between the bed and the front of the shell that absorbs and dissipates kinetic energy of the infant and orients the bed includes a horizontal wall in series force relationship between the top of the bed and the front of the shell. This horizontal wall provides a fulcrum for the bed so that upon the rapid deceleration, the bed rotates about the fulcrum to provide the rolling or rotation of the infant without much relative movement of the infant with respect to the bed walls. I also prefer that the shell in back of the seat belt catch and over the energy absorbtion and dissipation structure provide a barrier that keeps the infant in the carrier during vertical forces on the infant, forces that occur, for example, during vehicle roll over. A torso girdle may also provide restraint of the infant.

Preferably, the carrier provides protection of an infant by absorbtion and dissipation of energy in many directions. A double wall, for example, at either end of the bed with an air space between the walls will absorb and dissipate energy from side impact.

The bed and shell of the carrier may be formed of cardboard material having corrugations. The orientation of the corrugations can be tailored to effect desired deformation characteristics. While cardboard is a good material, the carrier can be made of other suitable material such as plastic. The carrier can be equipped with a strap so that it can be carried over the shoulder of a person when not in use in a vehicle.

The carrier of this invention absorbs kinetic energy of the infant during rapid deceleration that occurs as a result of, for example, an emergency stop or a collision. The carrier supports the infant along its back, neck and head at all times during the deceleration event by turning the infant so that it decelerates perpendicular to its support. The carrier reduces the forces acting on the infant and distributes the forces over its torso, neck and head during such an event, reducing the risk of serious injury. The carrier also protects an infant from the effect of forces coming from different directions: front-to-back, bottom-to-top, and side-to-side. The carrier also safely supports the infant from the forces occurring with normal travel in a manner that permits the infant to breathe without difficulty.

The invention includes blanks for forming the assembled carrier. A first blank for forming the shell and a second blank for forming the bed are foldable along lines from a planar configuration to the completed configuration.

These and other features, aspects, and advantages of the present invention will become more apparent from the following description, appended claims and drawings.

BRIEF DESCRIPTION OF THE DRAWINGS

FIG. 2 is a perspective, expanded view of the shell and bed of the carrier of the invention with the bed at a above the shell;

FIG. 3 is a plan view of a blank for forming a shell of the carrier of the present invention;

FIG. 4 is a side view of the blank of FIG. 3 showing the relationship of panels of the blank shortly after beginning to fold the panels to assemble the shell;

FIG. 5 is a view of the blank of FIG. 3 immediately prior to fully folding into the completed shell;

FIG. 6 is a plan view of a blank for forming a bed of the present invention;

FIG. 7 is a view of the blank of FIG. 6 shortly after to fold the blank to form the bed;

FIG. 8 is a view of the blank of FIG. 6 just before completing the folding into the bed; and FIG. 9–15 schematically illustrate deformation of the bed to support an infant all along its back, neck and head during rapid deceleration of a vehicle.

DESCRIPTION OF THE PREFERRED EMBODIMENTS

Figure 1:
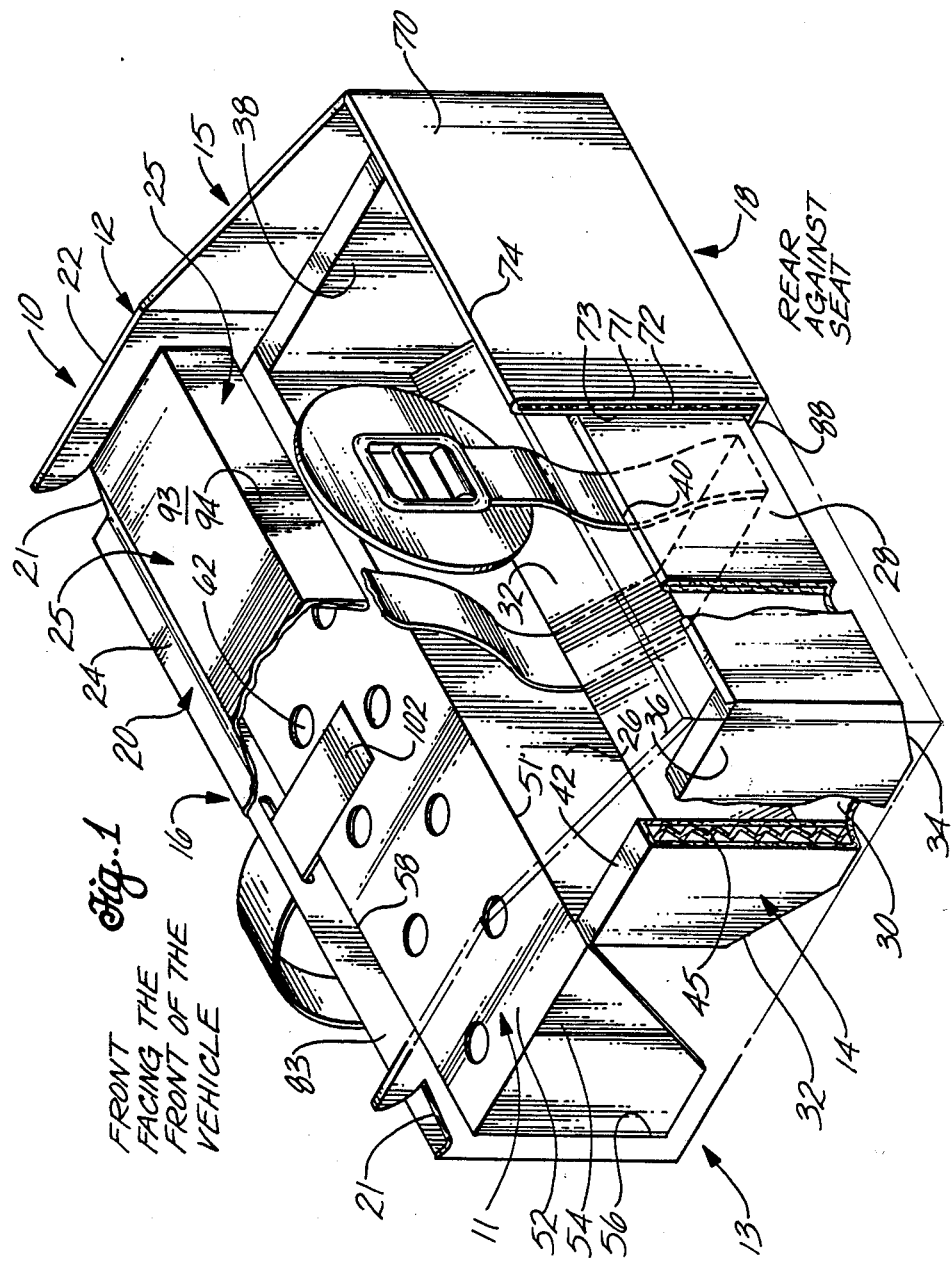
FIG. 1 is a perspective view of a carrier in accordance with this invention and shows a bed in a shell, one corner of the carrier being broken away to illustrate internal relationships between parts.

FIGS. 1 and 2 show a carrier 10 constructed according to the preferred embodiments of the present invention. The illustration of FIG. 1 is partly broken away; that of FIG. 2 expanded.

In general, the carrier includes an orientation and energy absorbtion structure 11, a shell 12 and a bed 14 received in the shell. The bed can be lifted from the shell and placed back into it if the need requires. As viewed in FIGS. 1 and 2, and with the carrier oriented as it would be in a vehicle, the carrier has a left side 13, a right side 15, a front 16 and a rear 18. The bed rests in the shell towards the shell's rear. The carrier has a seat belt catch 20 formed at its lateral ends of notches 21 in lateral walls of the shell, shown in FIG. 2, at 22 and 23, a load transfer wall 24, and a box like reinforcement 25. In use, the carrier is belted into a vehicle with a lap belt over the catch, in notches 21 and on, load transfer wall 24, and with the carrier between the belt and the back of the seat that supports it. The horizontal center of gravity of the carrier and an infant in it is below the seat belt catch to keep the carrier from rotating out of the belt. The carrier can have a shoulder strap so that it can be carried over the shoulder of a person.

With the carrier correctly belted into a vehicle, a premature infant can ride safely because bed 14 supports the infant recumbent all along its back, neck and head, and maintains that support through the inevitable jostling, bumps, accelerations, decelerations, and turns that accompany a ride. The bed directly supports the infant with surfaces generally perpendicular to the infant's head, neck and back. In the event that the infant should experience sudden deceleration forces of high magnitude because of a crash or panic stop, the infant, remaining recumbent, rolls or rotates in the horizontal while the inertial load of the infant acts generally perpendicular to the bed supporting surfaces so that these surfaces continue the support of the infant directly along its back, neck and head. During deceleration, kinetic energy of the infant is absorbed and dissipated by the bed and the shell permanently deforming, reducing the deceleration of the infant and the inertial forces on the infant attending the deceleration.

Bed 14 has an interior 27 with dimensions that slightly exceed the length, width and thickness of a premature infant so that the infant is comfortably cradled. FIG. 11 shows this size relationship. The bed cradles the infant and directly supports the infant all along its back, neck and head. As seen in the first two FIGURES, these functions are accomplished by the bed being formed of a front vertical wall 26, a rear vertical wall 28, a bottom, horizontal wall 30, a forward inclined wall 32, a rearward inclined wall 34, and lateral, double thickness end walls 36 and 38. The inclined walls join the bottom wall with the front and rear walls. End walls 36 and 38 connect to the bed's front, rear and the inclined walls and holds the orientation of those walls. The bed then has an interior 27 bounded on all sides but the top by walls. An alternate bed configuration would be U-shaped. The shape of the bed should confine the infant along its sides and preferably, orient the infant so that it lies primarily on its back, but a little on its side.

Forward inclined wall 32 and bottom wall 30 directly support an infant all along the infant's head, neck and back during normal vehicle travel. These walls also support the infant along its head, neck and back during rapid deceleration resulting from a collision or a panic stop. During a rapid deceleration event, the entire bed rotates with the recumbent infant so that the back of the infant rotates from a more or less horizontal position to a more or less vertical position. Direct support of the infant's back, neck and head remains generally perpendicular to them and is constantly maintained during the rotation of the support from the horizontal to the vertical. Also, during this rotation the bed deforms and absorbs some of the kinetic energy of the infant, reducing the forces acting on the infant.

Rear wall 28 is a double thickness wall effected by bending panels along a line that becomes the top of this wall, the line being shown at 40 in FIG. 1.

As seen best in FIG. 1 end, walls 36 and 38 are double thickness walls with an air space between them formed by bending along parallel, spaced apart lines that forms an upper bridge connecting the components of each wall, the bridges being shown at 42 for wall 36 and 43 for wall 38. Spacers 45 within each of the double walls maintain the air space there and increase resistance to deformation.

The double end walls provide energy dissipation during a side impact event on the carrier, such as from a collision on the side of the vehicle. During such an event, structure of the vehicle tends to intrude into the carrier; the carrier resists because of the seat belt and to some extent the inertia of the infant. The double side walls provide an energy absorber and dissipator to attenuate the effect of such an impact on an infant in the carrier. The walls do this in the same manner as the other structure of the carrier: they permanently deform and while doing so absorb and dissipate energy.

Front wall 26 and inclined walls 32 and 34 are single thickness.

Much of the kinetic energy that the carrier absorbs and dissipates is absorbed by orientation and energy absorbtion structure 11. This structure, resists translation of the bed towards the front of the vehicle because it engages the bed along the top of vertical wall 26 and because it has wings that also engage the bed. This resistance develops a small pocket for the infant under the energy absorbtion and orientation structure and reinforcing structure of the seat belt catch; the latter keeping the infant in the carrier even though the infant experiences vertical forces.

With reference to FIGS. 1 and 2, orientation and energy absorbtion structure 11 includes an upper, horizontal wall 52 that connects at a fold 51 directly to vertical wall 26 of the bed and extends the length of the bed. During rapid deceleration, horizontal wall 52 is loaded by the infant and transmits the load to the front of the shell. A pair of wings 54 and 55 at the lateral ends of orientation and energy absorbtion structure 11 fold down 90 degrees from the lateral ends of wall 52. Front edges 56 and 57 of these wings bear directly against the front of the shell. As with the force transmitted by horizontal wall 52, the load from the infant on the wings is transmitted to the front of the shell, and it in turn transmits the load to the seat belt catch and to the seat belt. As seen in FIG. 2, rear edges 58 and 59 of the wings incline down and away from the bed from fold 51 to develop a space 60 between front wall 26 and edges 58 and 59. The space permits the bed's front, inclined, and rear walls to rotate during rapid deceleration under the inertial load of an infant to load the infant perpendicularly essentially only along its back, neck and head and move into a pocket developing because of such loading under wall 52 and seat belt catch 20 and box structure. The seat belt catch and box structure aid in physically restraining the infant and keeping the infant in the carrier in the event of vertical forces on the infant. Horizontal wall 52 also deforms during this rotation to absorb and dissipate kinetic energy of the infant. Once space 60 closes, wings 54 and 55 can transmit the infant's inertial load from the bed through the wings and into the shell while deforming to absorb some of the kinetic energy of the infant. Horizontal wall 52 can be provided with means to control its strength, such as holes 62.

The wings at either lateral end of the bed make the bed more resistant to deformation at its ends than in its middle. The effect is that in a crash the position of the infant changes from essentially straight to a position more like the fetal position. The bed always directly supports the infant along its head, neck and back during this change in position.

Accordingly, the orientation and energy absorbtion structure serves many functions: (1) it transmits the infant's inertial load through horizontal wall 52 and the wings to the shell and ultimately to a seat belt; (2) it forces the bed to rotate from inertial loading by the infant and to rotate the infant so that the infant's inertial load is always applied perpendicularly and directly to the bed through the infant's head, neck and back; (3) it allows the seat belt catch to keep the infant in the carrier during the rapid deceleration and vertical forces by permitting the bed to move under the seat belt catch and the box reinforcing structure; and (4) it absorbs kinetic energy of the infant, reducing reaction forces on the infant.

FIGS. 9 and 10 show an alternate way of accomplishing these functions. There, a wing 64 of energy absorbtion and orientation structure 65 directly engages vertical wall 26 of the bed without any interventing space and resists movement of the bed at the very outset of rapid deceleration. Wing 64 also permanently deforms during such deceleration to help absorb kinetic of the infant. There is a second such wing on the other side of energy absorbtion and orientation structure 65. These wings can be connected directly to vertical bed wall 26.

The carrier provides crash and panic stop protection from forces acting in many directions. One of these directions is the direction of vehicle forward travel. With a crash or panic stop, the inertia of an infant moves the infant with respect to the vehicle because the vehicle decelerates first. In this direction, the energy absorbtion and orientation structure between the bed and the front of the shell, the bed, the shell, and the seat belt catch all absorb and dissipate kinetic energy of the infant to reduce the forces on the infant. In the event of a rear end collision, rearward inclined wall 34 at the rear of the bed permanently deforms and absorbs kinetic energy of the infant, and it in combination with the seat back reduce the forces acting on the infant. During side impact, the end walls of the bed likewise deform and absorb impact energy. During roll over or other vertical displacing forces, the carrier keeps the infant in it because of a torso girdle and because of the barrier provided by the reinforcement wall of the seat belt catch.

The infant carrier of this invention also provides excellent rebound protection. The carrier does this because of its ability to dissipate impact energy in a number of directions. Rebound forces from a frontal collision are partially absorbed by rearward inclined wall 34, the space between it an the shell providing plenty of room for energy absorbing permanent deformation. In addition, the back of the shell can permanently deform to absorb even more rebound energy. To the extent that rebound energy is directed along the infant, the end walls of the bed absorb and dissipate some of the energy. Again the hollow space within the end walls gives the end walls plenty of room to deform and because of this a good capacity for dissipating energy directed along the length of the infant. Reinforcing wall 25 of the seat belt catch also provides rebound protection because it confines the infant in the carrier and deforms, also dissipating energy.

The details of the construction of the particularly illustrated carrier will now be described.

As seen in FIG. 1, at rear side 18 of shell 12, the shell includes a rear wall 70 formed of three panels, 71, 72 and 73. Panels 71 and 73 fold over along a fold 74 that forms the top of the wall. Panel 72 is a separate panel sandwiched between the other two panels.

As seen in FIG. 2, lateral walls 22 and 23, similarly, are formed of double panels. Wall 23 has folds 76 and 78 at its top. A pair of flaps 80 and 82 extend down from the folds to form the inside of the wall. Wall 23 is similarly formed. The shell is completed by a front wall 83.

As can be seen in FIGS. 2 and 3, the bottom of the shell includes interior flaps 84 and 86 that extend from the side walls 22 and 23. Flaps 84 and 85 overlie cooperating flaps 88, 90 and 91 that extend from the front and rear walls of the shell. Flap 91 extends from the rear wall completely between walls 22 and 23. Flaps 88 and 90 join in the middle between the two end walls.

As can be seen in FIGS. 1 and 2, seat belt catch 20 of shell 12 includes inclined load transfer wall 24 between notches 21 and against which a lap belt bears. This wall is reinforced by box-like structure 25 to the rear of it. This box-like structure includes a horizontal upper wall 93 and a vertical rear wall 94. Vertical rear wall 94 connects to horizontal wall 93 along a fold. Vertical rear wall 94 is a double wall formed by bending panels back on themselves (as will be seen later.) As seen in FIG. 2, the box-like structure includes end walls 95 and 96. Vertical rear wall 94 couples to end walls 95 and 96 through tabs 98 and 100. These tabs are glued to the end walls. End walls 95 and 96 are also glued to lateral end walls 23 and 22, respectively.

The box-like structure of the seat belt catch provides a very strong catch so that its integrity is largely maintained during rapid deceleration so that the carrier is maintained in proper orientation with respect to the belt and does not, for example, rotate out of engagement with the belt. The box-like structure also provides a barrier that keeps an infant in the carrier when the infant experiences vertical forces, as during a vehicle roll over.

As seen in FIGS. 1 and 2, orientation and energy absorbtion structure 11 mounts a strap 102 medially on wall 52. The strap extends towards the front of the carrier. Strap 102 passes out of a notch 104 in shell front wall 83 and back into the inside of the shell through a notch 106 in wall 83.

As can be seen in FIG. 2, lateral walls 22 and 23 of the shell have resilient flaps 108 (shown only for panel 23) that further couples the lap belt to the carrier so that the two are in proper relationships to each other at all times.

FIGS. 3 through 5 show the shell as a blank and how the blank is folded into the shell. The blank has a horizontal fold line 120 extending from left to right. Beginning on the right-hand side of FIG. 3, panels 71 and 73 form a part of rear wall 70, with panel 73 folding over panel 71, see FIG. 1. These two panels move 180° from the FIG. 3 depiction to the completed shell of FIGS. 1 and 2. First, they rotate vertically 90° around a fold 122 and then vertically again through connecting panels 90° along a fold 126. Flap 88 forms a portion of the bottom and folds 90° on fold 120 and 180° in the vertical, following panels 71 and 73. Flap 88 covers about a quarter of the bottom.

Vertical fold line 122 is between flap 71 and a panel 124. Panel 124 constitutes the outer portion of wall 22. See FIG. 2 for the position of wall 22 in the completed shell. Flaps 80 and 82 of wall 22 fold along fold lines 76 and 78 180° against panel 124 to complete the interior side of wall 22. Interior bottom flap 84 folds 90° along horizontal fold 120 and 90° in the vertical because it follows panel 124 as it rotates along fold 126. Flap 88 passes under flap 84.

Vertical fold 126 separates panel 124 of wall 22 from front wall 83 of the shell. Panel 124 rotates vertically about fold 126 90°. Bottom flap 91 folds along fold line 120 90° with respect to front wall 83.

A third vertical fold 130 between front wall 83 and an exterior side panel 132 of lateral wall 23 rotates 90° with respect to front wall 83 along vertical fold 130. Flaps 134 and 136 fold 180° along folds 137 and 138, respectively, over panel 132 to complete lateral wall 23. A bottom flap 86 folds along horizontal fold 120 90°. with respect to panel 132 and vertically 90° along vertical fold 130.

A fourth vertical fold 140 mirrors fold 122. A panel 142 folds 90° on fold 140 with respect to panel 132 and 90° on vertical fold 130 to rotate a total of 180° and define a portion of the rear wall of the shell.

Bottom flap 90 complements flap 88 and forms a portion of the exposed bottom.

For rear wall 70, an upper panel 144 folds along a horizontal fold 146 over panel 142 to provide a double wall which complements the wall formed from panels 71 and 73. A separate piece forms panel 71 that is sandwiched between panels 71 and 73 and between panels 142 and 144.

The box-like backing for the seat belt catch has already been largely defined. To complete the description and with reference to FIG. 3, it includes a first horizontal fold 148 and a second horizontal fold 150 that produce an inclined wall 152 between front wall 83 and load transfer wall 24. Load transfer wall 24 folds along fold 150. Wall 24 has tabs 154 and 156 at its ends that are received in complementary slots in the shell side walls. Horizontal upper wall 93 joins load transfer wall 24 at a fold 158.

Vertical walls 95 and 96 join horizontal wall 93 along vertical folds 160 and 162. End wall 94 is defined by double panels 164 and 166 that fold over each other along fold 168.

FIG. 4 shows the shell in an intermediate state of assembly. The shell already takes the form of a box. The FIGURE shows panel 132 and flaps 134 and 136 just before the latter fold along folds 137 and 138 to form lateral wall 23. It shows seat belt catch 20 just before forming vertical end wall 94 and with tab 98 folding inside of end wall 95 where they join by gluing. Tab 156, as previously stated, folds into a slot in lateral wall 23. Panels 164 and 166 fold against each other to form vertical rear wall 94. Upper panel 144 folds over fold 146 to form the inner side of rear wall 70.

FIG. 5 complements FIG. 4, and shows further development of the shell. It shows the lateral and rear walls complete and the seat belt catch just about completely in place with tab 156 going into a slot in lateral wall 23.

FIG. 6 shows the blank for the bed. Beginning at the top of FIG. 6, rear wall 28 is formed of double panels 170 and 172 that fold along a fold line 40. End walls 36 and 38 are also double thickness walls defined by flaps 174 and 176 for end wall 38, and flaps 178 and 180 for end wall 36.

Flap 176 connects to panel 172 along a fold 182. Flap 174 connects to flap 176 along a fold 184.

Cuts 186 and 188 free flap 174 from panel 170 and flap 176 from an adjacent flap 190. In like manner, flap 180 connects to panel 172 along a fold 192. Flap 178 connects to flap 180 along a fold 194.

Cuts 196 and 198 separate flap 178 from panel 170 and flap 180 from an adjacent flap 200. Flap 190 and flap 200 at each end wall connect to the panel through folds 202 and 204, respectively. Tabs 206 and 208 connect to forward inclined wall 32 along folds 210 and 212, respectively. Similarly, tabs 214 and 216 connect to wall 26 along folds 218 and 220, respectively. Vertical wall 26 connects directly with horizontal wall 52 at fold 51.

With reference to FIG. 7, end wall flap 176 is shown folded 90° with respect to panel 172 along fold 182. Flap 174 extends from flap 176, not yet having been folded 180° about fold 184. Panel 170 is shown just prior to folding over panel 172 to form rear wall 28. Flap 190, extending from wall 30, is sandwiched between folded flaps 174 and 176. But in FIG. 7, this has not happened yet, and flap 190 is folded 90° with respect to wall 30 in preparation for being sandwiched. Tab 206 folds up to touch the vertical edge of flap 190 to define the inclination of inclined wall 32. Tab 206 also sandwiches between flaps 174 and 176. Tab 214, in like manner, closes on tab 206 to define the inclination of wall 26 with respect to wall 32, and tab 206 sandwiches between the same two flaps.

FIG. 8 shows the bed almost completed with only the front panel 170 to be folded into place. As such, end flap 174 has been folded over flap 176 and flap 190 and tabs 206 and 214 have been sandwiched between them.

Where the shell and the bed have double thickness walls, the components of the walls may be glued together.

FIGS. 9 through 15 illustrate the operation of the carrier of the present invention. These FIGURES also show modest changes in the carrier of the previous FIGURES. The FIGURES show schematically what happens to a six pound infant being decelerated from 30 miles per hour to zero miles per hour in about 70 milliseconds at a constant inertial load during this time of about 20 g's. Just before this rapid deceleration, the infant and the carrier look as they do in FIGS. 9 through 11. The infant is supported recumbent all along its head, neck and back by inclined wall 32 and horizontal wall 30. Vertical wall 26 and inclined wall 34 confine the infant so that its support is from walls 32 and 30. A seat belt anchors the carrier and infant to the vehicle, the belt is shown received in notch 21 of the seat belt catch and angling down to the right.

FIG. 12 shows the infant and carrier at impact. No movement of the infant or the component parts of the carrier has occurred, although the force on the infant is 20g's.

FIG. 13 shows the infant and carrier forty (40) milliseconds after impact. The bed has deformed and rotated. Inclined wall 32 has rotated nearly into the vertical. Horizontal wall 30 has rotated towards the vertical. Rear wall 28 has moved away from the back of the shell. Wing 64 has deformed substantially to absorb and dissipate kinetic energy of the infant.

FIG. 14 shows the infant and carrier eighty (80) milliseconds after impact. The infant and the bed have rotated substantially 90°. from the positions they occupied before impact. The infant and bed have also moved towards the front of the carrier inasmuch wing 64 has totally buckled and collapsed, absorbing and dissipating kinetic energy while doing so. The shell, as well, deforms to contribute to the absorbtion and dissipation of kinetic energy. The infant has thus decelerated over a distance measured approximately by the distance between the vertical front wall of the bed and the front of the shell plus some give by the seat belt. The infant's kinetic energy was absorbed over this distance; this energy was dissipated and so very little rebound occurred. The infant has also moved under the seat belt catch reinforcing structure so that the structure prevents the infant from leaving the carrier in the event it experience vertical displacement forces.

FIG. 15 shows the infant and carrier 160 milliseconds after impact. The infant has returned to a horizontal position with its head, neck and back supported. The energy absorbtion and orientation means has been permanently deformed. So has the bed.

The present invention has been described with reference to certain preferred embodiments. The spirit and scope of the appended claims should not, however, necessarily be limited to this description.

I claim:

1. An improved infant carrier for premature and underweight infants comprising:
   (a) a shell having walls of material that permanently deform in response to inertial loading by an infant undergoing a predetermined rapid deceleration, a hollow interior and a seat belt catch, the seat belt catch including means for engaging a seat belt of a vehicle at the front and top of the shell;
   (b) a bed received in the shell, the bed having walls of material that permanently deforms in response to inertial loading by an infant undergoing the predetermined rapid deceleration and that surround a space sized to receive a recumbent infant along the length of the bed, the walls being capable of supporting the infant recumbent in the horizontal directly along its back, neck and head with the weight of the infant acting generally perpendicular to the supporting walls during normal vehicle motion and upon the predetermined rapid deceleration supporting the inertial load of the recumbent infant in the vertical directly along and perpendicular to its back, neck and head;

(c) means to rotate the recumbent infant upon the rapid deceleration from the horizontal to the vertical while supporting the inertial load of the infant in the perpendicular directly along its back, neck and head; and (d) energy absorbtion and orientation means between the bed and the front of the shell, such means being in series force relationship between the bed and the front of the shell, the energy absorbtion and orientation means being of permanently deformable material to fail and absorb and dissipate kinetic energy of the infant during the rapid deceleration.

2. The improved infant carrier for premature and underweight infants claimed in claim 1 wherein:
the walls of the bed include a horizontal bottom wall and a forward inclined wall that provide the horizontal support for the infant.

3. The improved infant carrier for premature and underweight infants claimed in claim 2 wherein:
the rotation means includes a wall of the energy absorbtion and orientation means engaging the walls of the bed to provide a fulcrum about which the bed rotates upon undergoing the predetermined rapid deceleration.

4. The improved infant carrier for premature and underweight infants claimed in claim 3 wherein the seat belt catch includes an inclined wall extending the length of the shell for being engaged by the seat belt and a reinforcing wall that overlies the energy absorbtion and orientation means to confine the infant in the carrier against vertical forces occurring after failure of the energy absorbtion and orientation means.

5. The improved infant carrier for premature and underweight infants claimed in claim 3 wherein the bed walls include a rear vertical wall, a rear inclined wall connecting the rear wall and the bottom wall, and a forward vertical wall connected to the forward inclined wall and the wall of the energy absorbtion and orientation means that provides the fulcrum.

6. The improved infant carrier for premature and underweight infants claimed in claim 5 wherein the wall of energy absorbtion and orientation means that provides the fulcrum includes a horizontal wall between the top of the front vertical wall of the bed and the front of the shell.

7. The improved infant carrier for premature and underweight infants claimed in claim 6 wherein the energy absorbtion and orientation means includes vertical wings at the lateral ends of the upper horizontal wall between the vertical wall of the bed and the front wall of the shell, each of the vertical wings having inclined rear edges so that a triangular shaped space exists between the front vertical wall of the bed and the wings.

8. The improved infant carrier for premature and underweight infants claimed in claim 6 wherein the energy absorbtion and orientation means includes vertical wings between the vertical wall of the bed and the front wall of the shell.

9. The improved infant carrier for premature and underweight infants claimed in claim 6 wherein the bed includes end walls between the rear and front walls of the bed, the end walls being of permanently deformable material to absorb and dissipate impact energy during side impact of the vehicle.

10. An improved infant carrier for premature and underweight infant comprising:

(a) a generally rectangular parallelepiped shell having a front, a rear and opposing side vertical walls and a bottom wall, the walls being made of material that permanently deforms in response to inertial loading by the infant at a predetermined rapid deceleration, a hollow interior within the walls, and a seat belt catch, the seat belt catch including means for engaging a seat belt of a vehicle proximate the top of the front wall;

(b) a bed received in the shell, the bed having in this order a front vertical wall, a forward inclined wall, a bottom horizontal wall, a rearward inclined wall, and a rear vertical wall, the walls being formed of a material which permanently deforms under the inertial load of the infant undergoing the predetermined rapid deceleration, the walls providing a space sized to receive a recumbent infant lying lengthwise on the bottom and forward inclined walls and parallel to the front of the shell so that the infant lies with its head and feet facing the sides of the vehicle, the bottom and the forward inclined walls being capable of supporting the infant's weight directly along and perpendicular to its back, neck and head, the bed also having end walls between the bed's front and rear walls, the end walls being of permanently deformable material so that they fail and absorb impact energy acting on them generally parallel to the length of the infant;

(c) means responding to the inertial load of the recumbent infant at the predetermined rapid deceleration to rotate the infant while supporting it directly and perpendicularly along its back, neck and head from the horizontal to the vertical;

(d) energy absorbtion and orientation means between the front vertical wall of the bed and the front vertical wall of the shell, such means spacing the bed toward the rear of the shell and being in series force relationship between the bed and the front of the shell, the energy absorbtion and orientation means being of material that deforms in response to inertial loading by the infant at the predetermined rapid deceleration to absorb and dissipate kinetic energy of the infant during the rapid deceleration and forcing the bed to form a pocket to contain the infant; and (e) a reinforcing wall of the seat belt catch that extends over the energy absorbtion and orientation means and attaches to the side walls of the shell to resist forces applied to the shell through the seat belt and to provide a barrier for the infant after the energy absorbtion and orientation means begins to deform to keep the infant from leaving the carrier in response to vertical forces.

11. The improved infant carrier for a premature or underweight infant claimed in claim 10 wherein the means that permits rotation includes the bed and the energy absorbtion and orientation means includes means between the bed and the front wall of the shell that increases resistance to displacement of the bed after a predetermined amount of rotation of the bed.

12. The improved infant carrier for a premature or underweight infant claimed in claim 11 wherein the resistance increasing means includes vertical wings between the front wall of the shell and the front wall of the bed.

13. The improved infant carrier for a premature or underweight infant claimed in claim 12 wherein the vertical wings are at each lateral end of the bed so that the bed deforms more in response to the inertial load in its middle than at on its ends.

14. The improved infant carrier for a premature or underweight infant claimed in claim 10 wherein the energy absorbtion and orientation means includes a horizontal wall between the front vertical wall of the bed and the front of the shell and vertical wings proximate the side walls of the shell, the wings having rear edges inclining away from the front vertical wall of the bed towards the bottom wall of the shell so that a space exists between the wings and the front vertical wall of the bed that permits the bed to pivot under the horizontal wall of the energy absorbtion and orientation means.

15. An improved infant carrier for transporting a premature or underweight infant in a vehicle comprising:
(a) a shell having an interior for receiving the infant while recumbent and a seat belt catch, the seat belt catch being capable of receiving a standard seat belt to hold the carrier in place on the seat of a vehicle during normal vehicle movement and during rapid deceleration above the center of gravity of the infant during such deceleration, the rapid deceleration being in the fore and aft direction of the vehicle and resulting from the vehicle crashing or undergoing a panic stop;
(b) horizontal support means in the shell for directly supporting the recumbent infant in the horizontal along the infant's head, neck, and back during the normal vehicle movement;
(c) vertical support means in the shell for directly supporting in the vertical the recumbent infant along the infant's head, neck and back;
(d) means in the shell to direct rotation of the infant while recumbent from the horizontal support means to the vertical support means during the rapid deceleration and in response to the inertia of the infant while maintaining direct support of the infant along the infant's head, neck and back;
(e) energy absorption means in series force relationship between the vertical support means and the seat belt catch to absorb kinetic energy of the infant during the rapid deceleration by permanent deformation; and
(f) side energy absorbtion means facing the recumbent infant at each end of the infant to absorb kinetic energy of the infant by permanent deformation of such means during side impact of the vehicle.

16. The improved infant carrier for transporting a premature or underweight infant in a vehicle claimed in claim 15 wherein the horizontal and vertical support means for directly supporting the recumbent infant and the rotation means includes an inclined wall sized to extend the length of the infant.

17. The improved infant carrier for transporting a premature or underweight infant in a vehicle claimed in claim 16 wherein the horizontal support means for directly supporting the recumbent infant includes a horizontal wall sized to extend the length of the infant, the horizontal wall being adjacent to the inclined wall.

18. The improved infant carrier for transporting a premature or underweight infant in a vehicle claimed in claim 17 wherein the energy absorbtion means includes the horizontal and vertical support means being permanently deformable under the inertial load of the infant during the rapid deceleration to absorb kinetic energy of the infant.

19. The improved infant carrier for transporting a premature or underweight infant in a vehicle claimed in claim 15 wherein the energy absorbtion and orientation means includes a horizontal wall between the top of the vertical support means and the front of the shell, the vertical support means being capable of displacement under the horizontal wall of the energy absorbtion and orientation means in response to the inertial load of the infant during the rapid deceleration to develop a pocket that tends to keep the infant in the carrier during the rapid deceleration and the horizontal wall of the energy absorbtion and orientation means permanently deforms and foreshortens under the inertial load to absorb kinetic energy of the infant.

20. The improved infant carrier for transporting a premature or underweight infant in a vehicle claimed in claim 15 wherein the energy absorbtion and orientation means includes a horizontal wall that extends the length of the vertical support means to lateral ends of such means and a pair of wings that extend vertically down to be engaged by the vertical support means during the rapid deceleration to reinforce such vertical support means, the wings also being made of permanently deformable material that deforms under the inertial load of the infant during the rapid deceleration to absorb kinetic energy of the infant.

21. The improved infant carrier for transporting a premature or underweight infant in a vehicle claimed in claim 20 wherein the wings engage the vertical support means before the rapid deceleration and are at each end of such means.

22. The improved infant carrier for transporting a premature or underweight infant in a vehicle claimed in claim 20 wherein the wings incline away from the vertical support means at its top to its bottom to develop a space between such means and the wings so that upon the rapid deceleration the vertical support means rotates to close the space and then engages the wings.

23. The improved infant carrier for transporting a premature or underweight infant in a vehicle claimed in claim 20 wherein the seat belt catch includes a wall that extends the length of the shell that from bottom to top inclines rearwardly, this inclined wall being capable of direct engagement with a seat belt.

24. The improved infant carrier for transporting a premature or underweight infant in a vehicle claimed in claim 23 wherein the seat belt catch includes a reinforcing structure that extends the length of and engages the inclined wall of the seat belt catch and extends to the rear of it, the reinforcing structure being attached to the shell.

25. An improved infant carrier for a premature or underweight infant for use in a vehicle comprising:
(a) a shell having walls of material that permanently deforms and absorbs kinetic energy of the infant in response to the inertial loading by the infant at a predetermined rapid deceleration occasioned by a collision or panic stop, a hollow interior and a seat belt catch, the seat belt catch including means for engaging a seat belt of the vehicle at the front and top of the shell;

(b) a bed received in the shell, the bed having transverse walls of material that permanently deforms and absorbs kinetic energy of the infant in response to the inertial loading of the infant at the predetermined rapid deceleration, the transverse walls surrounding a space sized to receive the infant when recumbent along the length of the bed and perpendicular to the fore and daft direction of the vehicle, the transverse walls also being capable of supporting the recumbent infant directly along its head, neck and back in the horizontal during normal motion of the vehicle and of supporting the infant directly along its head, neck and back in the vertical during the predetermined rapid deceleration, the bed also having end walls at the ends of the transverse walls and oriented generally parallel to the fore and aft direction of the vehicle, the end walls being of permanently deformable material to absorb and dissipate impact energy during side impact of the vehicle;

(c) means for rotating the recumbent infant from the horizontal to the vertical during the predetermined rapid deceleration while maintaining the support along the infant's head, neck and back; and (d) energy absorbtion and orientation means between the bed and the front of the shell, such means being in series force relationship between the bed and the front of the shell, the energy absorbtion and orientation means being of a material that permanently deforms and absorbs kinetic energy of the infant during the rapid deceleration.

26. The improved infant carrier for a premature or underweight infant claimed in claim 25 wherein the seat belt catch includes an inclined wall extending the length of the shell for being engaged by the seat belt.

27. The improved infant carrier for a premature or underweight infant claimed in claim 25 wherein the bed walls include a forward vertical wall, a forward inclined wall, a bottom horizontal wall, a rear inclined wall and a rear vertical wall positioned in the order recited.

28. The improved infant carrier for a premature or underweight infant claimed in claim 25 wherein the energy absorbtion and orientation means includes a horizontal upper wall between the walls of the bed and the front of the shell so that the bed tends to rotate under the horizontal wall while such wall buckles in response to the inertia of the premature infant during the rapid deceleration.

29. The improved infant carrier for a premature or underweight infant claimed in claim 28 wherein the energy absorbtion and orientation means includes vertical wings at the lateral ends of the horizontal wall of such means and between the bed and the front wall of the shell, each of the vertical wings having inclined rear edges so that a triangular shaped space exists between the front vertical wall of the bed and the wings.

30. The improved infant carrier for a premature or underweight infant claimed in claim 28 wherein the energy absorbtion and orientation means includes vertical wings at the lateral ends of the upper horizontal wall between the bed and the front wall of the shell.

31. The improved infant carrier for a premature or underweight infant claimed in claim 30 wherein the seat belt catch includes a reinforcement structure between the seat belt catch inclined wall and the rear of the shell, the reinforcement structure being attached to the side walls of the shell, the reinforcement structure providing a barrier for the infant during and after deformation of the energy absorbtion and orientation means to keep the infant in the carrier despite vertical forces acting on the infant.

32. An improved infant carrier for use in transporting premature and underweight infants in a vehicle comprising:

(a) a generally rectangular parallelepiped shell having a front wall, a rear wall, opposing side vertical walls, and a horizontal bottom wall, the walls being made of a material that permanently deforms and absorbs kinetic energy of the infant in response to the inertial load of an infant undergoing a predetermined rapid deceleration produced by a crash or panic stop of the vehicle, the shell having a hollow interior within the walls, and a seat belt catch, the seat belt catch including means for engaging a seat belt of the vehicle proximate the top of the front wall;

(b) a bed received in the shell, the bed having an axis paralleling the front and rear walls of the shell and walls to receive and support the infant when it is recumbent and oriented along the axis, the walls directly supporting the infant along its head, neck and back in the horizontal during normal vehicle motion and in the vertical during the predetermined rapid deceleration, the bed walls being of a material that permanently deforms and absorbs kinetic energy of the infant in response to inertial loading by the infant during the rapid deceleration, the bed walls permitting the infant to rotate while recumbent from the horizontal to the vertical during the rapid deceleration; and (c) energy absorbtion and orientation means between the bed and the front wall of the shell, such means force relationship between the bed and the front of the shell, the energy absorbtion and orientation means being of a material that permanently deforms in response to inertial loading by the infant at the predetermined rapid deceleration to absorb kinetic energy of the infant, the energy absorbtion and orientation means forcing the bed to rotate the infant from the horizontal to the vertical during the rapid deceleration.

33. The improved infant carrier for premature and underweight infants claimed in claim 32 wherein the energy absorbtion and orientation means includes permanently deformable wings between the bed and the front wall of the shell that increases resistance to displacement of the bed during the rapid deceleration and forces preferentially greater deformation of the bed between its lateral ends.

34. The improved infant carrier for premature and underweight infants claimed in claim 32 wherein the seat belt catch includes an inclined wall extending the length of the carrier at its upper front and that is capable of engaging a seat belt all along this length and a reinforcing wall between the inclined wall and the back of shell, the reinforcing wall being attached to the side walls of the shell and providing a barrier against vertical movement of the infant during and after deformation of the energy absorbtion and orientation means, the seat belt catch being of a material that permanently deforms and absorbs kinetic energy of the infant under the inertial load of the infant at the predetermined deceleration, and a torso girdle attached to the bed to restrain the infant in the bed.

35. The improved infant carrier for premature and underweight infants claimed in claim 32 wherein the bed includes end walls between the front and rear walls of the bed, the end walls being of permanently deformable material to absorb and dissipate impact energy during side impact of the vehicle.

36. The improved infant carrier for premature and underweight infants claimed in claim 2 wherein the bed includes end walls at the ends of the first mentioned bed walls, the end walls being of permanently deformable material to absorb and dissipate impact energy during side impact of the vehicle.

37. The improved infant carrier for premature and underweight infants claimed in claim 1 wherein the bed includes end walls at the ends of the first mentioned bed walls, the end walls being of permanently deformable material to absorb and dissipate impact energy during side impact of the vehicle.

* * * * *

UNITED STATES PATENT AND TRADEMARK OFFICE
CERTIFICATE OF CORRECTION

PATENT NO. : 4,934,004

DATED : June 19, 1990

INVENTOR(S) : Donald Friedman

It is certified that error appears in the above-identified patent and that said Letters Patent is hereby corrected as shown below:

```
Column 1, line 37, delete "reaction loads".

Column 3, line 24, change "roll over" to -- rollover --.

Column 4, line 3, before "above" insert -- position --.
Column 4, line 13, after "after" insert -- beginning --.
Column 4, line 17, change "FIG." to -- FIGS. --.
Column 4, line 37, change "box like" to -- box-like --.
Column 4, line 39, after "on" delete the comma.

Column 5, line 35, after "end" move the comma to come
          after "1".
Column 5, line 58, after "structure" delete the comma.
Column 5, line 59, before "vehicle" change "the" to
          -- a --.

Column 6, line 60, after "kinetic" insert -- energy --.

Column 7, line 11, change "roll over" to -- rollover --.
Column 7, line 21, after "it" change "an" to -- and --.

Column 8, line 6, change "roll over" to -- rollover --.
Column 8, line 17, change "relationships" to
          -- relationship --.
Column 8, line 49, after "90°" delete the period.
Column 8, line 61, after "73" insert -- in wall 70 --.

Column 10, line 20, change "20g's" to -- 20 g's --.
Column 10, line 30, after "90°" delete the period.
```

UNITED STATES PATENT AND TRADEMARK OFFICE
CERTIFICATE OF CORRECTION

PATENT NO. : 4,934,004
DATED : June 19, 1990
INVENTOR(S) : Donald Friedman

It is certified that error appears in the above-identified patent and that said Letters Patent is hereby corrected as shown below:

```
Column 10, line 32, after "inasmuch" insert -- as --.
Column 10, line 45, change "experience" to
          -- experiences --.

Column 11, line 44, change "claim 3" to -- claim 4 --.

Column 13, line 10, after "than" delete "at".

Column 15, line 10, change "daft" to -- aft --.

Column 16, line 38, after "means" insert
          -- being in series --.
Column 16, line 61, after "back of" insert -- the --.
```

Signed and Sealed this

Fifteenth Day of October, 1991

Attest:

HARRY F. MANBECK, JR.

*Attesting Officer*  *Commissioner of Patents and Trademarks*